United States Patent
Uyeno et al.

(10) Patent No.: US 11,522,331 B2
(45) Date of Patent: Dec. 6, 2022

(54) COHERENT OPTICAL BEAM COMBINATION USING MICRO-ELECTRO-MECHANICAL SYSTEM (MEMS) MICRO-MIRROR ARRAYS (MMAS) THAT EXHIBIT TIP/TILT/PISTON (TTP) ACTUATION

(71) Applicant: Raytheon Company, Waltham, MA (US)

(72) Inventors: Gerald P. Uyeno, Tucson, AZ (US);
Sean D. Keller, Tucson, AZ (US);
Benn H. Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 17/029,915

(22) Filed: Sep. 23, 2020

(65) Prior Publication Data

US 2022/0094128 A1  Mar. 24, 2022

(51) Int. Cl.
*H01S 3/13* (2006.01)
*H01S 3/00* (2006.01)
(Continued)

(52) U.S. Cl.
CPC ........ *H01S 3/0071* (2013.01); *G02B 26/0833* (2013.01); *H01S 3/10053* (2013.01);
(Continued)

(58) Field of Classification Search
CPC .. H01S 3/0071; H01S 3/10053; H01S 3/1305; H01S 3/1307; H01S 3/2308; H01S 3/2383; H01S 3/2391; G02B 26/0833
See application file for complete search history.

(56) References Cited

U.S. PATENT DOCUMENTS

| 5,404,375 A | 4/1995 | Kroeger et al. |
| 5,854,702 A | 12/1998 | Ishikawa et al. |

(Continued)

FOREIGN PATENT DOCUMENTS

| DE | 102011104023.8 B4 | 7/2019 |
| EP | 2667142 A1 | 11/2013 |

(Continued)

OTHER PUBLICATIONS

"Application Serial No. 16/871,602, Non Final Office Action dated Nov. 9, 2020", 18 pgs.

(Continued)

*Primary Examiner* — Michael Carter
(74) *Attorney, Agent, or Firm* — Schwegman Lundberg & Woessner, P.A.

(57) ABSTRACT

A tip/tilt/piston ("TTP") MEMS MMA is used to provide coherent beam combination (CBC) such that the combined beam behaves as if it were emitted from a single aperture laser, but with higher brightness than can be obtained from an individual laser. Piston actuation of the mirrors is used to adjust the phase of individual amplified laser beams and maintain a zero phase difference across all of the amplified laser beams. Tip/Tilt actuation of the mirrors is used to steer the phase-adjusted amplified laser beams to form a coherent output laser beam. Additional TTP actuation can be used to oversample and superimpose Adaptive Optics correction or focusing/defocusing on the beam. A multi-spectral system may be implemented with a common MEMS MMA to produce a spectrally beam combined, multi-channel coherent laser beam.

20 Claims, 9 Drawing Sheets

(51) Int. Cl.
  *H01S 3/10* (2006.01)
  *H01S 3/23* (2006.01)
  *G02B 26/08* (2006.01)

(52) U.S. Cl.
  CPC .......... *H01S 3/1307* (2013.01); *H01S 3/2308* (2013.01); *H01S 3/2383* (2013.01); *H01S 3/2391* (2013.01); *H01S 3/1305* (2013.01)

(56) References Cited

U.S. PATENT DOCUMENTS

| | | | |
|---|---|---|---|
| 6,181,450 B1 | 1/2001 | Dishman et al. | |
| 6,271,953 B1 | 8/2001 | Dishman et al. | |
| 6,327,063 B1 | 12/2001 | Rockwell | |
| 6,526,352 B1 | 2/2003 | Breed et al. | |
| 6,567,574 B1 | 5/2003 | Ma et al. | |
| 6,792,028 B2 | 9/2004 | Cook et al. | |
| 6,816,315 B1 | 11/2004 | Ai et al. | |
| 7,304,296 B2 | 12/2007 | Mills et al. | |
| 7,593,641 B2 | 9/2009 | Tegge, Jr. | |
| 7,626,152 B2 | 12/2009 | King et al. | |
| 7,660,235 B2 | 2/2010 | Alicherry et al. | |
| 7,667,190 B2 | 2/2010 | Mills et al. | |
| 7,884,997 B2 | 2/2011 | Goodno | |
| 7,969,558 B2 | 6/2011 | Hall | |
| 8,164,037 B2 | 4/2012 | Jenkins et al. | |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,364,334 B2 | 1/2013 | Au et al. | |
| 8,368,889 B2 | 2/2013 | Schwiegerling et al. | |
| 8,380,025 B2 | 2/2013 | Anderson et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,983,293 B2 | 3/2015 | Frankel et al. | |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 | 2/2018 | Uyeno et al. | |
| 9,927,515 B2 | 3/2018 | Keller et al. | |
| 9,946,259 B2 | 4/2018 | Keller et al. | |
| 10,148,056 B2 | 12/2018 | Uyeno et al. | |
| 10,209,439 B2 | 2/2019 | Keller et al. | |
| 10,243,654 B1 | 3/2019 | Uyeno et al. | |
| 10,267,915 B2 | 4/2019 | Uyeno et al. | |
| 10,381,701 B2 | 8/2019 | Motoi | |
| 10,444,492 B2* | 10/2019 | Hopkins | G02B 26/105 |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 2002/0141689 A1 | 10/2002 | Qian et al. | |
| 2002/0196506 A1 | 12/2002 | Graves et al. | |
| 2003/0062468 A1 | 4/2003 | Byren et al. | |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2008/0084605 A1* | 4/2008 | Rothenberg | B23K 26/067 359/337.21 |
| 2010/0030473 A1 | 2/2010 | Au et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2013/0271818 A1 | 10/2013 | Bastien et al. | |
| 2014/0063299 A1 | 3/2014 | Fest et al. | |
| 2015/0099476 A1 | 4/2015 | Beals | |
| 2015/0138618 A1* | 5/2015 | Hamamoto | H01S 3/2383 359/239 |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0234703 A1 | 8/2016 | Aldana et al. | |
| 2016/0294472 A1 | 10/2016 | Palmer et al. | |
| 2017/0293137 A1 | 10/2017 | Zhao et al. | |
| 2018/0231715 A1 | 8/2018 | Bishop et al. | |
| 2019/0154921 A1 | 5/2019 | Xing et al. | |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 x 720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Siegman, A. E., "Unstable optical resonators for laser applications", Proceedings of the IEEE, vol. 53, Issue 3, (Mar. 1965), 277-287.

Wang, Jinxue, et al., "Doppler Winds Lidar Technology Development and Demonstration", AIAA-2005-6772, Space 2005, Long Beach, California, Aug. 30-1, 2005, 11 pgs.

(56) References Cited

OTHER PUBLICATIONS

Yamamoto, R., et al., "Evolution of a Solid State Laser", Proc. SPIE 6552, Laser Source Technology for Defense and Security III, 655205, (May 10, 2007), 11 pgs.
U.S. Appl. No. 17/007,917, filed Aug. 31, 2020, Electroniclly Steered Inter-Satellite Optical Communication System With Micro-Electromechanical (MEM) Micromirror Array (MMA).
"Mirrorcle Technologies MEMS Mirrors—Technical Overview", Mirrorcle Technologies, Inc., (2018), 7 pgs.
Anderegg, Jesse, et al., "Coherently Coupled High Power Fiber Arrays", Proc. of SPIE 6102, Fiber Lasers III: Technology, Systems, and Applications 61020U, (2006), 6 pgs.
Augst, S J, et al., "Coherent and spectral beam combining fiber lasers", Proc. SPIE 8237, Fiber Lasers IX: Technology, Systems, and Applications, 823704, (Feb. 13, 2012), 11 pgs.
Fan, T Y, "Laser Beam Combining or High-Power, High-Radiance Sources", IEEE Journal of Selected Topics in Quantum Electronics, vol. 11, No. 3, (May/Jun. 2005), 567-577.
Redmond, Shawn, et al., "Active coherent beam combining of diode lasers", Optics Letters vol. 36, No. 6, (Mar. 15, 2011), 999-1001.
"U.S. Appl. No. 17/007,917, Notice of Allowance dated Jan. 10, 2022", 14 pgs.
"U.S. Appl. No. 17/007,917, Response filed Dec. 1, 2021 to Non Final Office Action dated Aug. 3, 2021", 16 pgs.
"U.S. Appl. No. 17/007,917, Supplemental Notice of Allowability dated Apr. 19, 2022", 2 pgs.

* cited by examiner

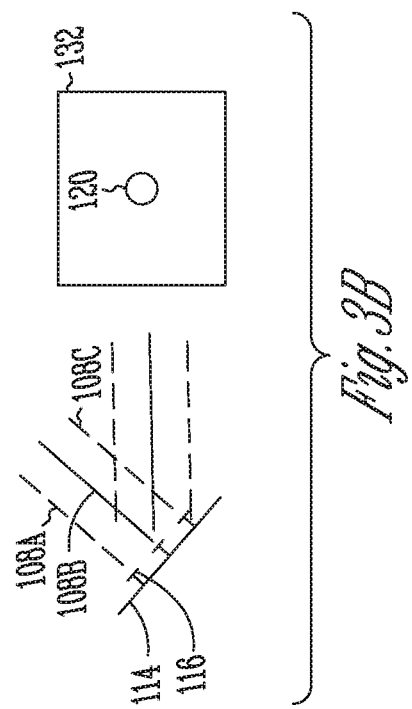
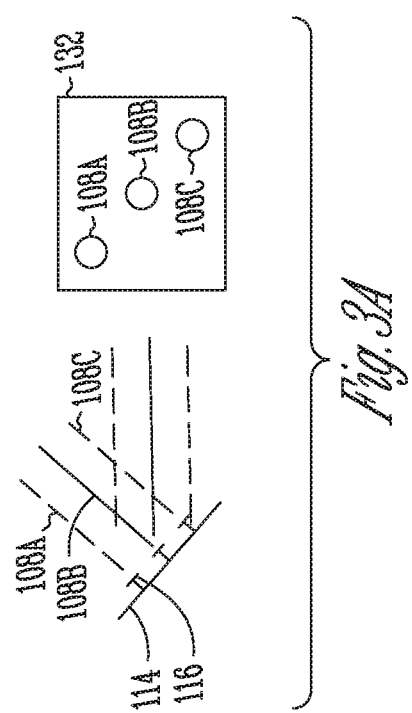

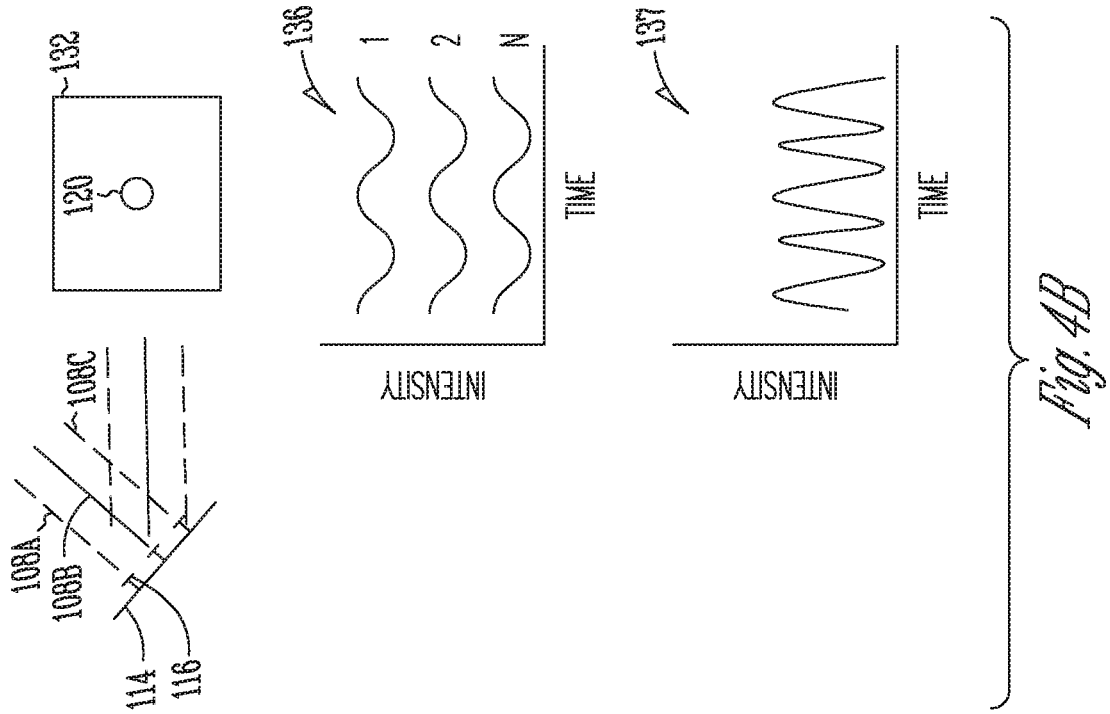
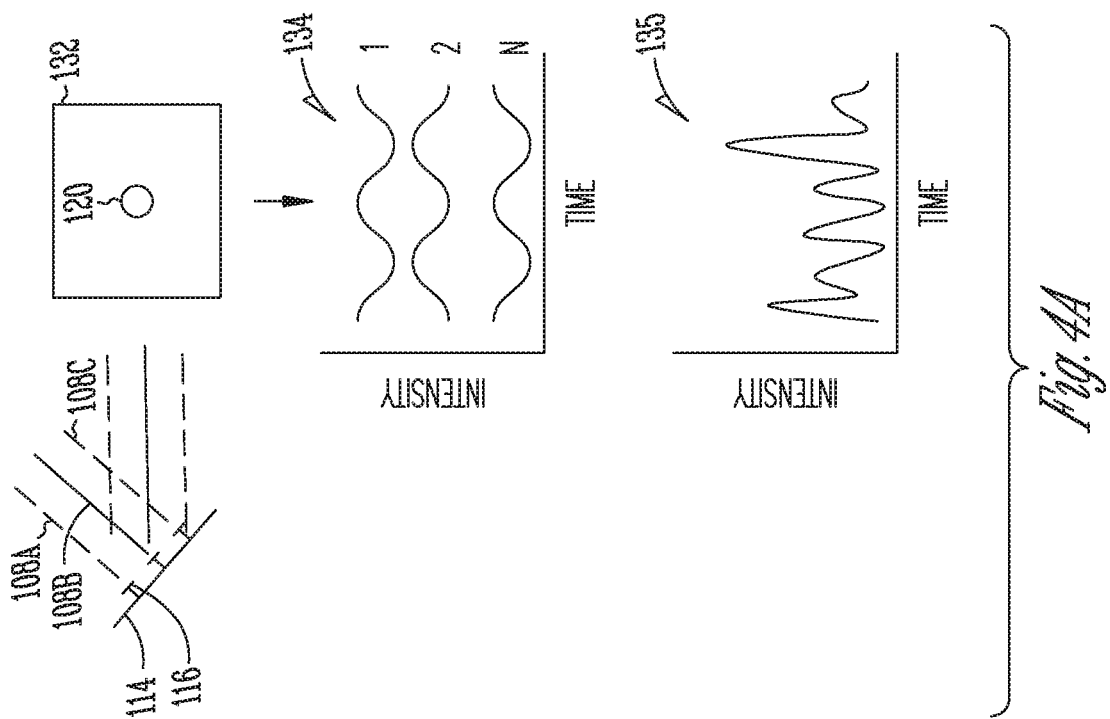

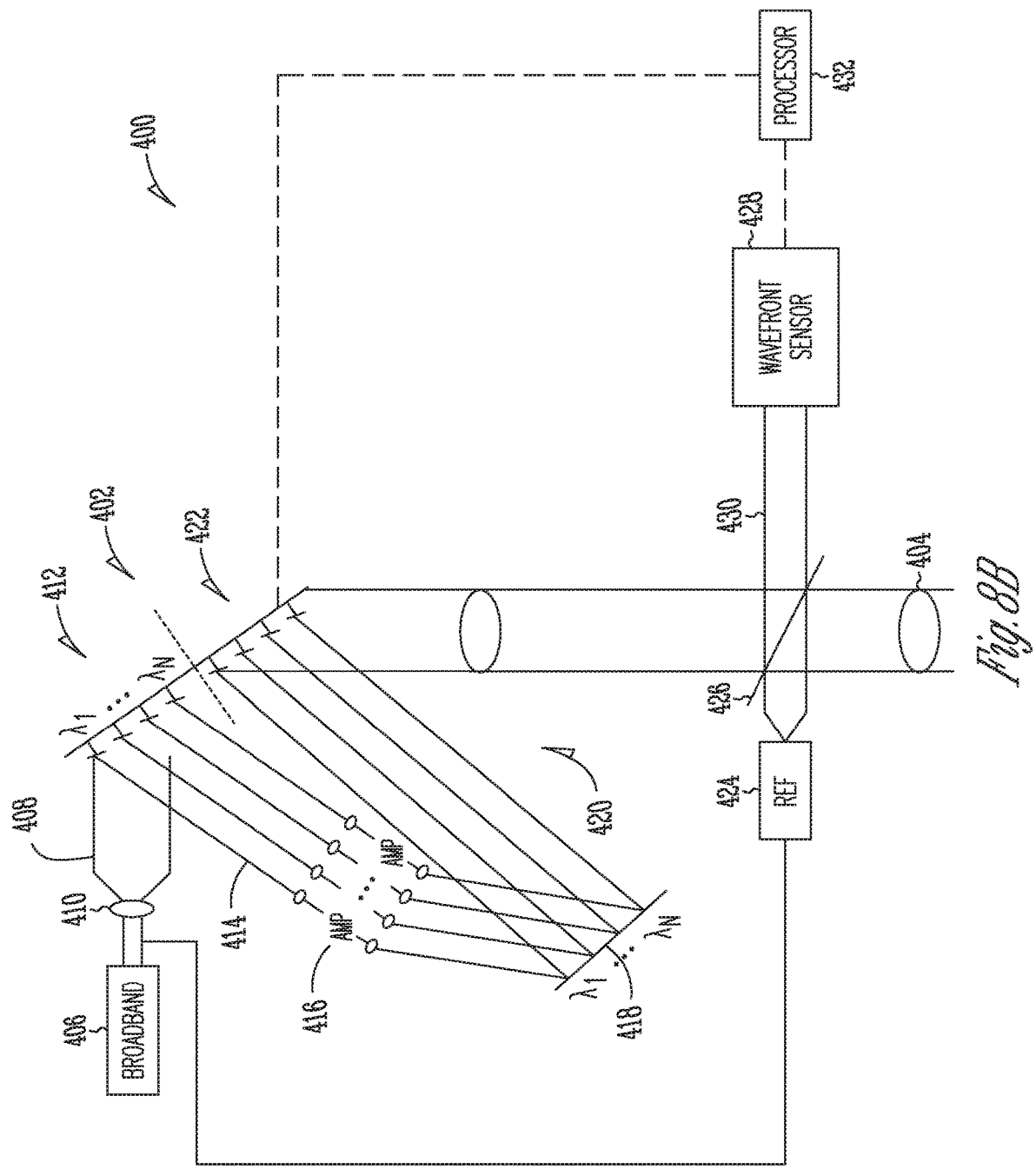

COHERENT OPTICAL BEAM COMBINATION USING MICRO-ELECTRO-MECHANICAL SYSTEM (MEMS) MICRO-MIRROR ARRAYS (MMAS) THAT EXHIBIT TIP/TILT/PISTON (TTP) ACTUATION

BACKGROUND OF THE INVENTION

Field of the Invention

This invention relates, in general, to systems for coherent beam combination (CBC) of laser beams and in particular to the use of a Micro-Electro-Mechanical System (MEMS) Micro-Mirror Array (MMA) that exhibits "tip/tilt/piston" actuation.

DESCRIPTION OF THE RELATED ART

Coherent beam combination (CBC) of laser amplifiers is a well-established technique for locking multiple laser emitters in phase with one another to form a high brightness beam. Typically, the output from a low-power master oscillator (MO) is split into a multiplicity of beams, each of which is passed through a laser amplifier to increase its power. The amplified output beams are combined geometrically and phase-locked to a reference beam that is also derived from the MO. The combined beam behaves as if it were emitted from a single aperture laser, but with higher brightness than can be obtained from an individual laser. CBC imposes a requirement that the optical path length through each laser amplifier in the phase-locked array must be matched to within a small fraction of the MO coherence length. If the optical path mismatch between any two channels exceeds a phase difference of PI (a), then the two elements will appear to be out of phase with one another, and they cannot be successfully combined. Even if the optical path mismatch is only a fraction of PI (a), the coherence combination between the two lasers will be less than 100%, leading to a reduction in the array brightness.

Due to the long path lengths involved with either free-space or fiber amplifiers (typically >10 m), it is difficult to match paths to within less than a few cm. Different amounts of thermal expansion or strain in each amplifier can cause the path mismatches to vary dynamically with the laser environment or thermal loads. This typically leads to a requirement that the MO coherence length be much greater than the anticipated path mismatches. The coherence length scales inversely with the laser bandwidth according to $L_{coh}=C\tau_{coh}\approx C/\Delta f$, where c is the speed of light, and $\Delta f$ is the laser bandwidth. Thus a practical path-matching tolerance of $\approx 10$ cm leads to a requirement that the laser bandwidth be several GHz or less.

In practice, the constraint is more restrictive than this to avoid any noticeable reduction in the coherence between individual emitters. For the case of fiber laser amplifiers, the use of narrow-band radiation from the MO imposes limits on the capacity to generate high power. Stimulated Brillouin Scattering (SBS) is a nonlinear effect in which the laser electric field creates a phase grating in the fiber core via electrostriction that reflects some fraction of the forward-propagating beam. If the effective reflectivity of this grating becomes too large, the output power from the fiber will decrease, with the lost power being reflected backwards towards the MO. SBS limits the powers available from narrow-bandwidth fiber lasers. SBS can also pose a damage risk to hardware if the reflected power feeds back into the MO and/or pre-amplifier. One approach to CBC requires a means to reduce SBS, Typically, this involves a controlled broadening of the MO spectrum, either via a rapidly varying chirp applied to the MO frequency or via static phase modulation. In either case, practical considerations of the path-matching stability between amplifier legs limits the amount of frequency broadening to several GHz.

U.S. Pat. No. 7,884,997 entitled "System and method for coherent beam combination" discloses a laser system comprising a master oscillator for generating a primary laser signal, a beam splitter array for splitting the primary laser signal into a sample reference signal and a plurality of secondary laser signals, an optical frequency shifter for shifting the frequency of the sample reference laser signal to provide a frequency-shifted reference beam and a beam expander for expanding the frequency-shifted reference beam to provide an expanded frequency-shifted reference beam. The laser system further comprises a plurality of amplifier arms that each receive a respective secondary laser signal of the plurality of secondary laser signals, where each amplifier arm comprises a path length adjuster for adjusting a path length of the amplifier arm and an amplifier for amplifying the secondary laser signal to provide an amplified output signal. The laser system also comprises a beam sampler that interferes the light of the amplified output signal of the plurality of amplifier arms with the expanded frequency-shifted reference beam to provide a plurality of optical beat signals, a plurality of photodetectors that each receive a respective optical beat signal to provide a plurality of optical heterodyne detected (OHD) beat signals, each OHD beat signal having a maximum amplitude that corresponds to a minimum path length mismatch of a respective amplifier arm and a path length controller responsive to the plurality of OHD beat signals for providing a plurality of feedback signals to adjust the path length adjusters to control the path length of each of the plurality of amplifier arms to within a coherence length of the primary laser signal.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for coherent beam combination (CBC) of amplified laser beams using a tip/tilt/piston ("TTP") MEMS MMA such that the combined beam behaves as if it were emitted from a single aperture laser, but with higher brightness than can be obtained from an individual laser.

In an embodiment, a laser system generates a plurality of amplified laser beams at the same wavelength in respective input channels exhibiting a non-zero phase difference across the input channels. A MEMS MMA comprising a plurality of independently and continuously controllable mirrors to tip and tilt each mirror about first and second orthogonal axes and to translate each mirror in a third axis orthogonal to a plane containing the first and second orthogonal axes is deployed to both correct the phase differences and combine the beams. The MEMS MMA is partitioned into segments, of one or more mirrors, that are illuminated by the respective amplified laser beams. A pick-off(s) is positioned to sample the amplified laser beams in each input channel or in a combined output channel and a wavefront sensor senses a phase difference across the sampled amplified laser beams. One or more processors are configured to generate a first set of command signals to translate the one or more mirrors in each segment along the third axis to adjust the phase and maintain a zero phase difference across all of the amplified laser beams and to generate a second set of command signals tip and tilt the mirrors about the first and second orthogonal axes, respectively, to combine the plurality of phase-adjusted amplified laser beams into a coherent output laser beam in the combined output channel.

In different embodiments, each segment includes a plurality of mirrors to oversample the amplified laser beam. These mirrors are further actuated to superimpose AO correction or focusing/defocusing on the beam.

In different embodiments, the pick-off may be implemented as a beam-splitter that samples the combined output beam or as a mirror from each segment that together sample each amplified input beam. In the latter case, the mirrors may be time multiplexed.

In an embodiment, translation of a mirror to provide phase-correction produces an offset of the reflected beam. The mirror may be tipped/tilted to correct for this offset.

In different embodiments, a multi-spectral laser system may be implemented in which MEMS MMA technology is used to combine input laser beams at different laser beams to first provide coherent beams at each wavelength and then to combine those beams to provide a spectrally beam combined, multi-channel coherent laser beam, in an embodiment, a single common MEMS MMA is partitioned into sections to process each wavelength and the final multi-spectral combination is superimposed on the phase-correction and combination of each channel. In an embodiment, additional phase correction is provided to maintain a zero phase difference across the multiple channels to provide a coherent multi-spectral laser beam.

In another embodiment, the common MEMS MMA is further partitioned into additional sections that are coated with reflective coatings at the different wavelengths. A broadband laser source illuminates these sections to produce a plurality of laser beams at each wavelength. These beams are amplified and reflected off a fold mirror back onto the MEMS MMA for phase-correction and combination into the multi-spectral output beam.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3A and 3B are diagrams of Tip/Tilt actuation to combine the phase-corrected amplified laser beams into a single output laser beam;

FIGS. 4A and 4B are diagrams of Piston actuation to maintain a zero phase difference across all of the amplified laser beams in the output laser beam;

FIGS. 8A and 8B are different embodiments for providing a spectrally beam combined, multi-channel coherent laser beam using TTP MEMS MMA technology.

DETAILED DESCRIPTION OF THE INVENTION

Figure 1:
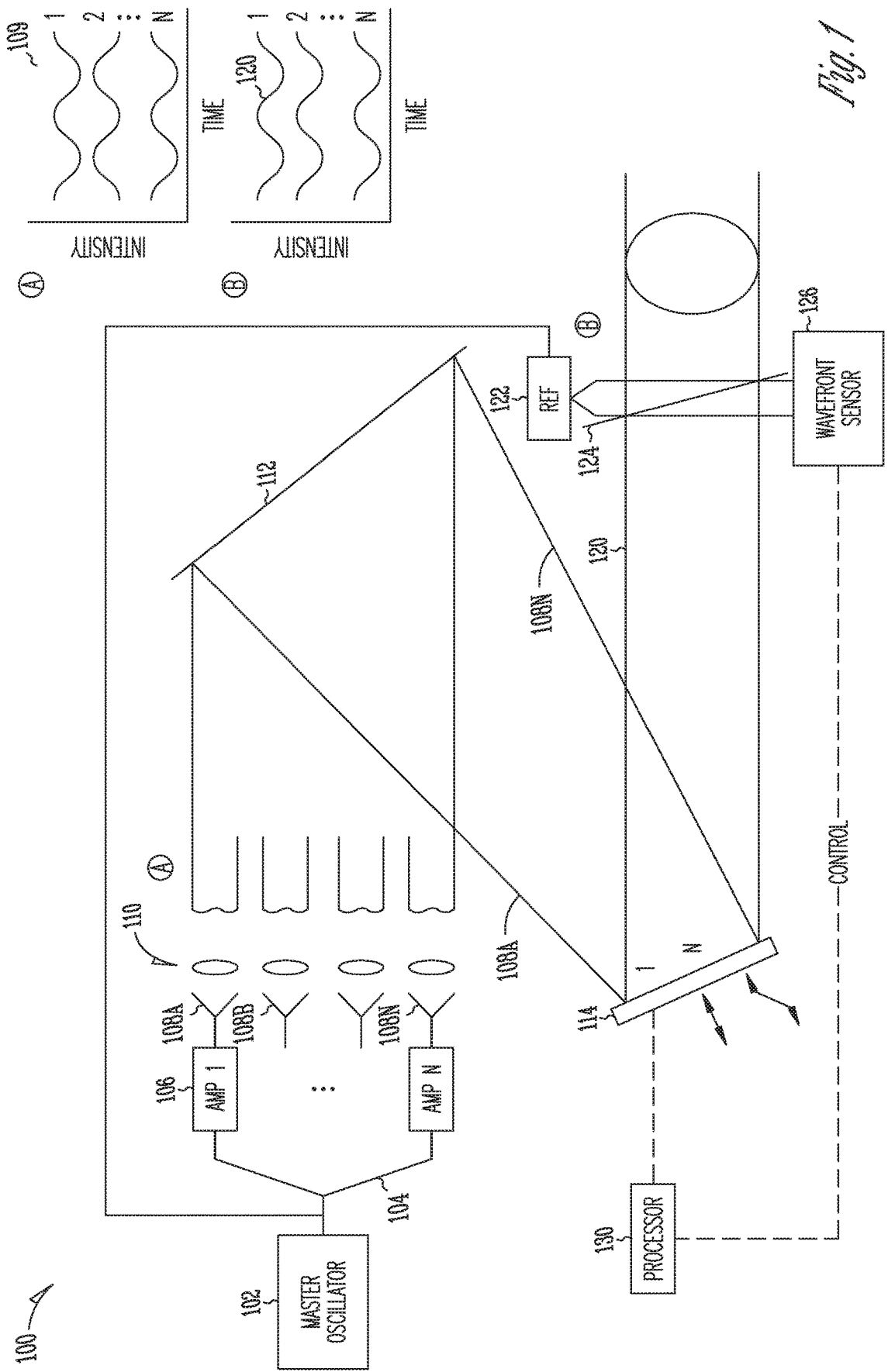
FIG. 1 is a block diagram of an embodiment of a CBC laser system using a Tip/Tilt/Piston (TTP) MEMS MMA to both maintain a zero phase difference across all of the amplified laser beams via Piston actuation and to steer and combine the amplified laser beams via the Tip/Tilt actuation using a standard pick-off.
Figure 2:
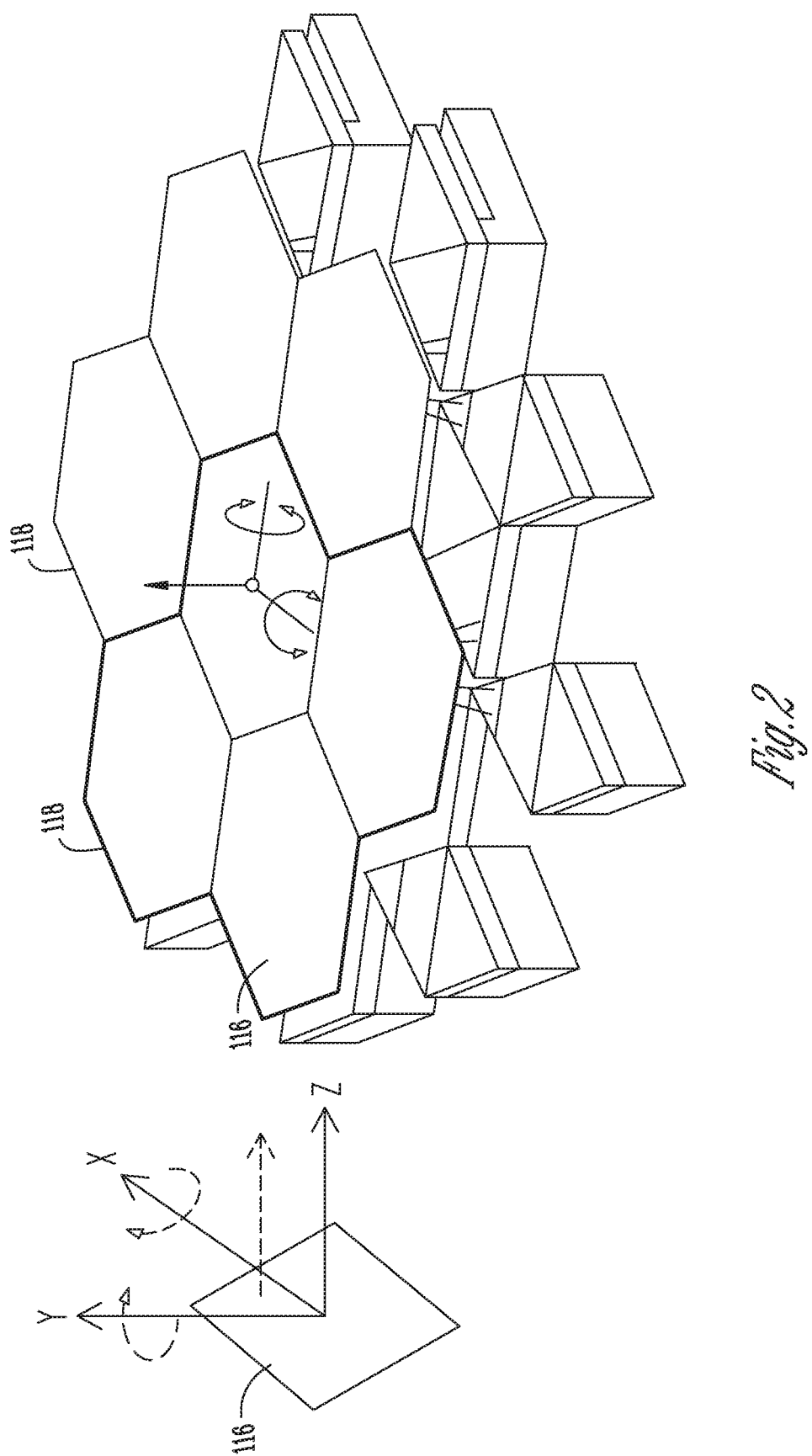
FIG. 2 is a diagram of an embodiment of a TTP DIEMS MMA and an individual mirror.

The present invention uses a tip/tilt/piston (TTP) MEMS MMA to provide coherent beam combination (CBC) such that the combined beam behaves as if it were emitted from a single aperture laser, but with higher brightness than can be obtained from an individual laser. Piston actuation of the mirrors is used to adjust the phase of individual amplified laser beams and maintain a zero phase difference across all of the amplified laser beams. Tip/Tilt actuation of the mirrors is used to steer the phase-adjusted amplified laser beams to form a coherent output laser beam. Additional TTP actuation can be used to oversample and superimpose AO correction or focusing/defocusing on the beam. A multi-spectral system may be implemented with a common MEMS MMA to produce a spectrally beam combined, multi-channel coherent laser beam.

Referring now to FIGS. 1, 2, 3A-3B, and 4A-4B an embodiment of a CBC laser system 100 includes a master oscillator (MO) 102 that generates a laser beam at a first wavelength λA beam splitter 104 splits the laser beam into a plurality of laser beams at the first wavelength λ1 that feed a plurality of optical amplifiers 106 that amplify the plurality of lasers beams, respectively, to provide the plurality of amplified laser beams 108A, 108B . . . 108N in respective input channels. Alternately, multiple different sources at the same wavelength may be configured to provide the laser beams that are fed to the amplifiers. Propagation of the laser beams through the optical amplifiers produces a non-zero phase difference 109 across the input channels. The amplified laser beams are passed through a lens array HO that collimates the beams and combines them into a single beam that is directed onto a fold mirror 112 that redirects the beam to a MEMS MMA 114. The fold mirror is only used for packaging reasons.

MEMS MMA 114 includes a plurality of independently and continuously controllable mirrors 116 as shown in FIGS. 3A-3B. Each mirror 116 is capable of "Tip" (rotation about an X-axis), "Tilt" (rotation about a Y-axis) and "Piston" (translation along a Z-axis, perpendicular to the XY plane) where the X, Y and Z are orthogonal axes in a three-dimensional space. The independently controllable mirrors can be adaptively partitioned to generate segments 118 of one or more mirrors that correspond to the respective input channels. The Piston actuation is used to translate mirror 116 back-and-forth to change the path length the amplified laser beam travels, hence adjust or correct the phase of the amplified laser beam. The MMA is preferably capable of translating the mirror+/−10 microns at a rate of at least 1 kHz. The Tip/Tilt actuation is used to rotate mirror 116 to change the reflected angle of the amplified laser beam. Together the mirrors in the different segments steer their respective phase-corrected amplified laser beams to combine the beams into an output laser beam 120. The MMA is preferably capable of steering an output laser beam over a steering range of at least +/−10° in tip and tilt at a steering rate of at least 1 kHz (<1 millisecond). Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

Output laser beam 120 is mixed with a reference beam 122 provided by master oscillator 102 via a beam combiner 124. The beam comber 124 also serves as a pick-off to sample the output laser beam. A wavefront sensor 126 measures variation in phase. The wavefront sensor is essentially an interferometer and an image sensor. The interference of the wavefronts of the component amplified laser beams is imaged onto the sensor. The amount of interference is extracted from the image as a measure of phase difference across the channels. An alternate method to accomplish the same sampling is by sampling the output beam and focusing using a micro-lens array onto a detector. The location of focused spots on the array identifies the phase of the wavefront. In this case the reference beam 122 is not required.

One or more processors 130 are configured to generate a first set of command signals, in response to control feedback from the wavefront sensor, to translate the one or more mirrors 116 in each segment 118 along the Z axis to adjust the phase and maintain a zero phase difference 120 across all of the amplified laser beams and to generate a second set of command signals tip and tilt the mirrors about the X and Y axes, respectively, to combine the plurality of phase-adjusted amplified laser beams into the coherent output laser beam 120 in the combined output channel.

Figure 5A:
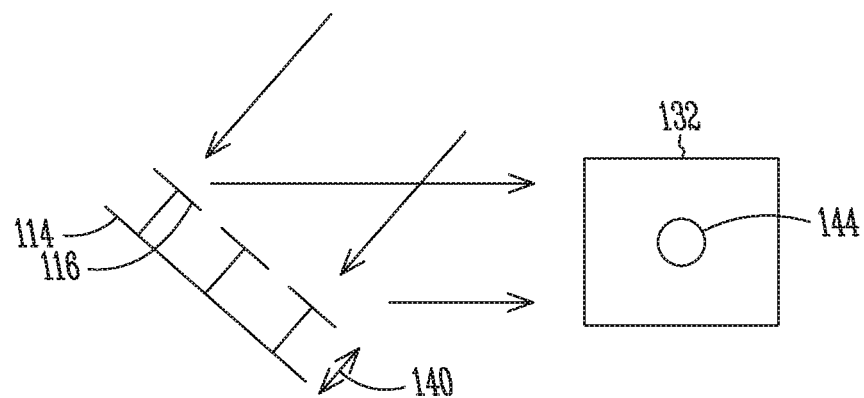
FIGS. 5A and 5B are diagrams illustrating an offset of the phase-corrected amplified laser beam reflected off of a Piston actuated mirror and correction thereof using tip/tilt.
Figure 5B:
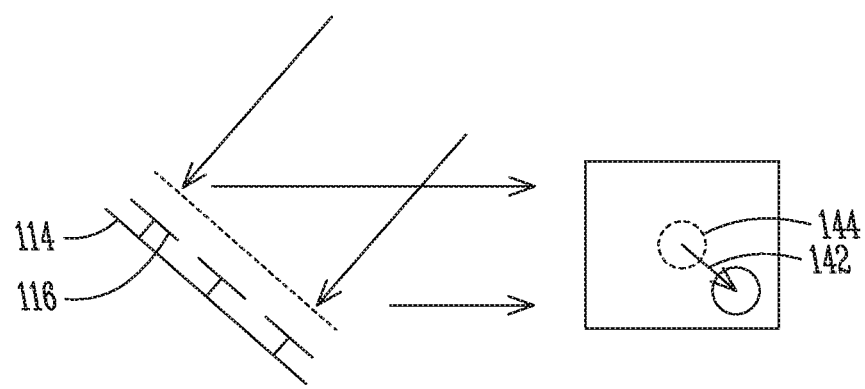

Referring now to FIGS. 3A-3B and 4A-4B, a portion of MEMS MMA 114 is depicted as having three mirrors 116, one per segment, to steer and phase-correct amplified laser beams 108A, 108B and 108C. As shown in FIG. 3A, with no tip/tilt correction the beams remain physically separated. As shown in FIG. 3B, when tip/tilt correction is applied the beams are combined into the single output laser beam 120. This can be measured by projecting the beams onto an image sensor 132. As shown in FIG. 4A, with no piston correction to adjust the relative phase of beams 108A, 108B and 108C the wavefronts of the beams are out of phase 134, which is also reflected in the combined intensity 135. As shown in FIG. 4B, when piston correction is applied to adjust the relative phase of the beams the wavefronts of the beam are in-phase 136, which is also reflected in the combined intensity 137, and maintain a zero phase difference across all the component beams Referring now to FIGS. 5A and 5B, the translation of mirrors 116 along the Z-axis from an initial position 140 to change the path length, hence relative phase between amplified laser beams can also have the effect of producing a lateral offset 142 of the reflected output beam 120 from a nominal position 144. The lateral offset 142 becomes more pronounced the larger the incident angle of the amplified laser beams to the MMA where the incident angle is defined to be zero at normal to the surface of the mirrors. The processor can issue command signals to tip/tilt the mirrors to correct or remove the lateral offset. These commands are superimposed or combined with the initial command signals for Tip/Tilt/Piston.

Figure 6A:
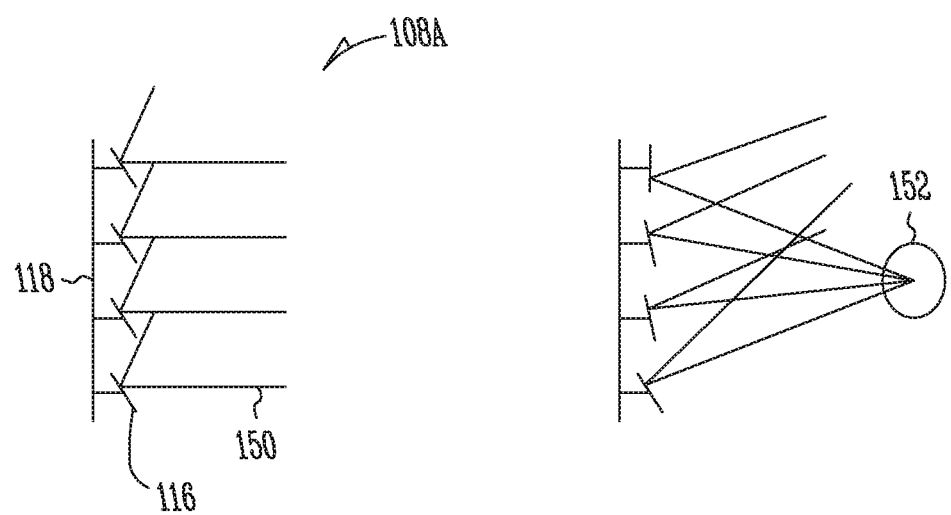
FIGS. 6A and 6B are different embodiments illustrating focus/defocus and Adaptive Optics (AO) implemented on a channel beam via TTP actuation.
Figure 6B:
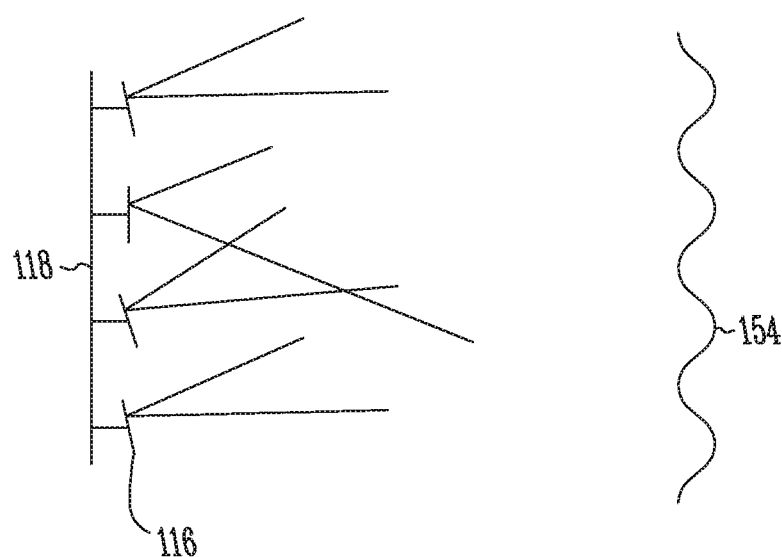

Referring now to FIGS. 6A and 6B, in this embodiment a segment 118 of the MEMS MMA 114 includes a plurality of mirrors 116 to oversample the amplified laser beam 108A. Since a given mirror can only handle a certain amount of optical power, oversampling allows for additional optical power in a given input channel. Furthermore, the mirrors within a segment can be independently controlled to further manipulate the wavefront. As shown in FIG. 6A, if all of the mirrors in segment 118 have the same tip/tilt, the reflected beam remains collimated 150. Alternately, the tip/tilt of the mirrors can be independently controlled to focus or defocus the beam 152. As shown in FIG. 6B, tip/tilt/piston can be controlled to provide correction for wavefront 154 such as for adaptive optics (AO).

Figure 7:
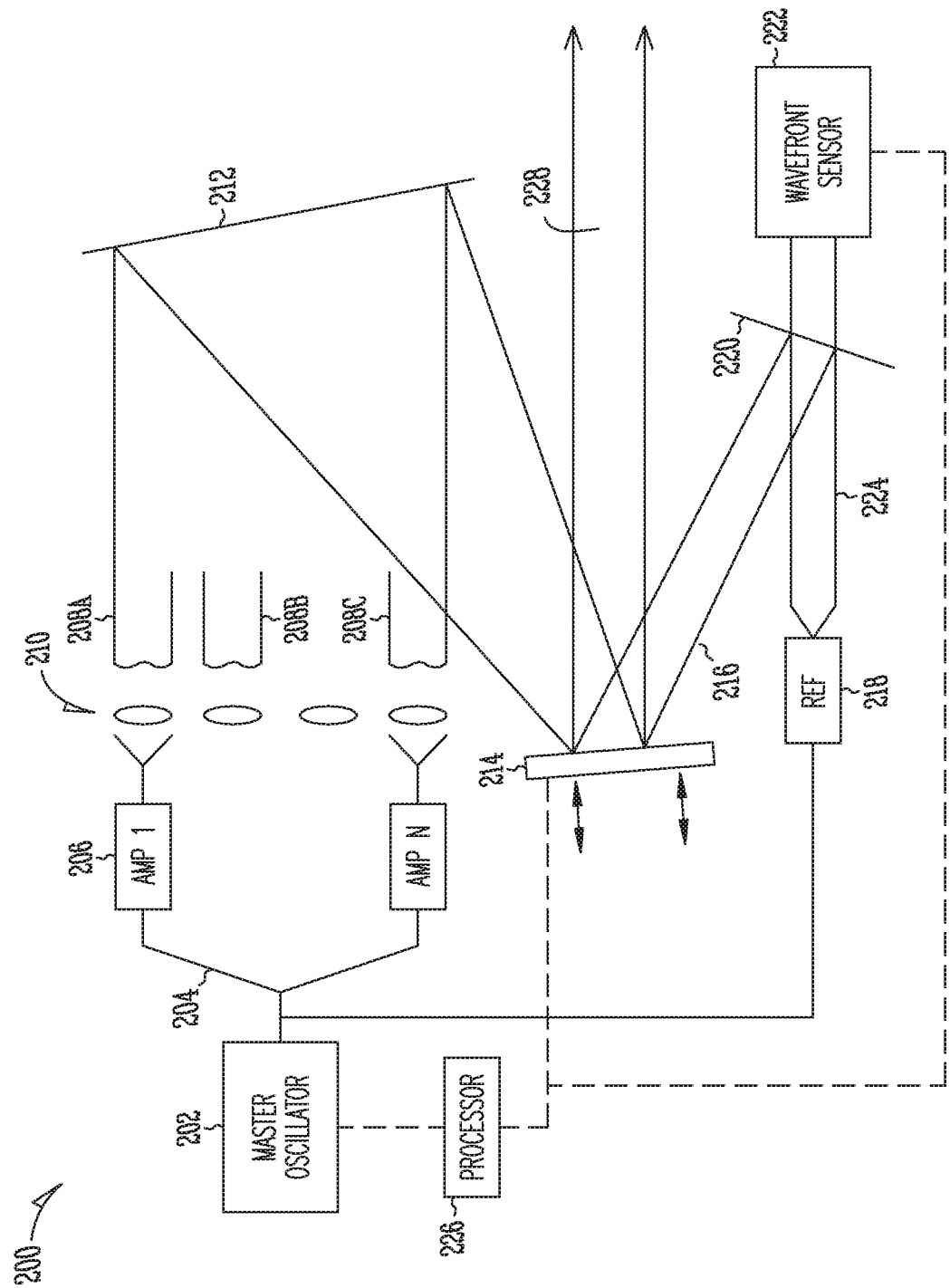
FIG. 7 is a block diagram of an embodiment of a CBC laser system using a Tip/Tilt/Piston (TTP) MEMS MMA in which a micromirror in each input channel provides a pick-off.

Referring now to FIG. 7, an embodiment of a CBC laser system 200 includes a master oscillator (MO) 202 that generates a laser beam at a first wavelength $\lambda 1$. A beam splitter 204 splits the laser beam into a plurality of laser beams at the first wavelength $\lambda 1$ that feed a plurality of optical amplifiers 206 that amplify the plurality of lasers beams, respectively, to provide the plurality of amplified laser beams 208A, 208B . . . 208N in respective input channels. The amplified laser beams are passed through a lens array 210 that collimates the beams and combines them into a single beam that is directed onto a fold mirror 212 that redirects the beam to a MEMS MMA 214.

MEMS MMA 214 is partitioned to generate segments that correspond to the respective input channels. In this embodiment, each segment includes a plurality of mirrors, at least one mirror for steering (tip/tilt) and phase control (piston) and at least one mirror to serve as a pick-off to sample (e.g. 1/Nth of the channel energy where N is the number of mirrors in the segment) each of the amplified laser beams. The sampled beams 216 are mixed with a reference beam 218 provided by master oscillator 202 via a beam combiner 220. A wavefront sensor 222 measures variation in phase of this combined beam 224 and provides control feedback to one or more processors 226. The processors generate the command signals to translate the mirrors in each segment to provide phase correction and to tip/tilt the phase-corrected amplified laser beams to form the main coherent output beam 228. The pick-off mirrors may be time multiplexed.

The MEMS MMA technology can be implemented to provide multi-spectral coherent beam combination. Generally speaking, instead of one set of amplified laser beams at a single wavelength that are phase-corrected and combined via a MEMS MMA to provide a high-power coherent laser beam at that wavelength, the system is scaled to process multiple sets of laser beams at different wavelengths that are phase-corrected within each wavelength and combined to provide a high-power spectrally beam combined, multi-channel coherent laser beam. A different MEMS MMA can be used to phase-correct and combine each of amplified laser beams and another MEMS MMA, used to each of the coherent output laser beams at the different wavelengths. However, the MEMS technology allows for consolidation of all of the phase-correction and beam steering into a single common MEMS MMA.

Figure 8A:
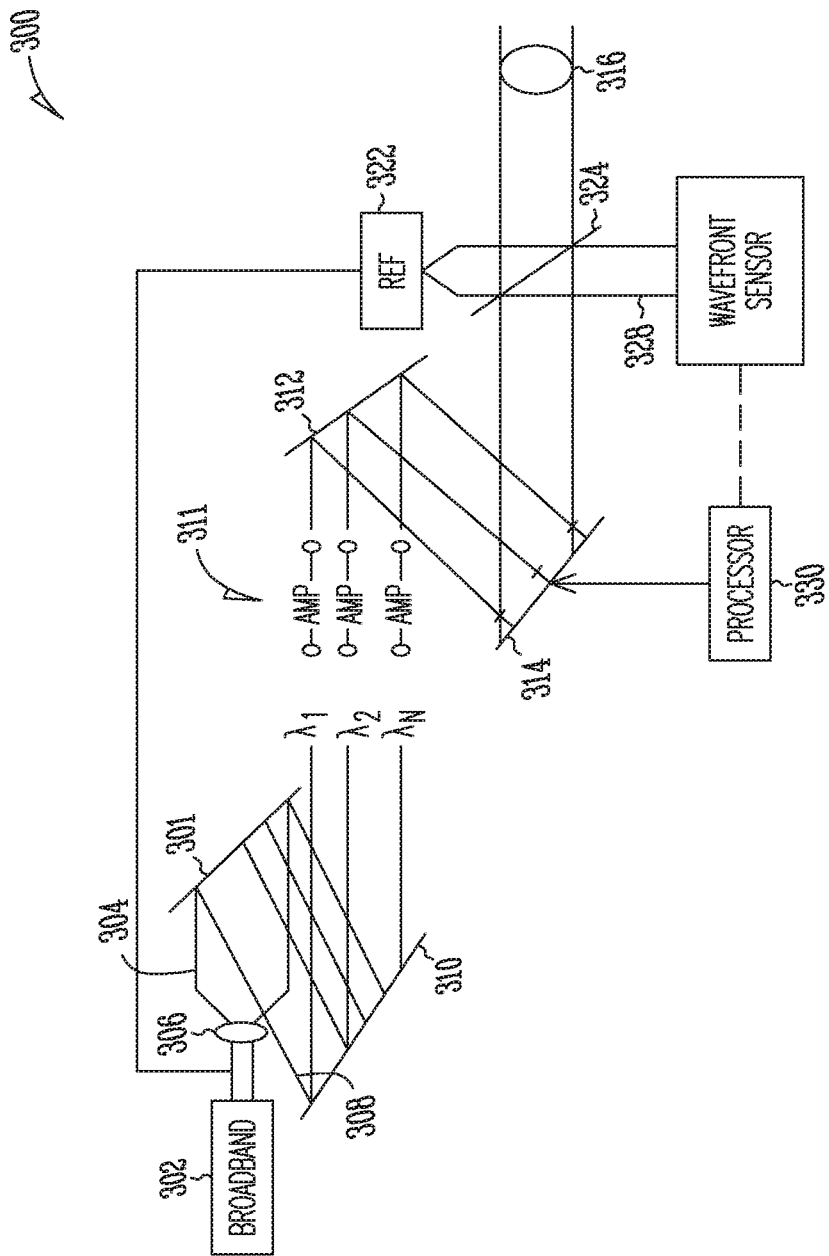

As shown in FIG. 8A, an embodiment of a multi-spectral CBC laser system 300 includes a first MEMS MMA 301 that is partitioned into a plurality of sections, one for each different wavelength. Each section is partitioned into one or more segments, one for each component laser beam. Each segment includes one or more mirrors to phase-correct and steer the component laser beam. The mirrors in each section are suitably provided with a reflective coating that provides a narrow bandpass filter at the corresponding wavelength.

A broadband laser source 302 generates a broadband laser beam 304 that spans the wavelengths of the reflective coatings. A lens 306 collimates beam 304 to illuminate the plurality of sections of MFMS MMA 301. Each section reflects at its wavelength to generate one or more laser beams 308 at that wavelength. For example, the mirrors in each section are provided with a reflective coating that reflects light at the corresponding wavelength. A fold mirror 310 redirects the laser beams 308 at each of the wavelengths to a respective plurality of optical amplifiers 311 to amplify each of the laser beams. A fold mirror 312 redirects the amplified laser beams onto different sections of a second MEMS MMA 314, one section for each wavelength. Each section is partitioned into one or more segments, one for each component laser beam, to "mirror" the partitioning of the first MEMA MMA 301.

Within each section (wavelength), the tip/tilt/piston of the mirrors is controlled to maintain zero phase difference across the component laser beams and to combine them into a single beam. Superimposed on top of this is additional tip/tilt correction to combine all of the spectral components into a spectrally beam combined, multi-channel coherent laser beam 316. In some applications, additional piston correction to maintain zero phase difference between the spectral components.

A pick-off, either a standard pick-off or a mirror in each segment of each section (i.e. for each component laser beam at each wavelength) is used to sample the component laser beams. The sampled beams are mixed with a reference beam 322 provided by broadband source 302 via a beam combiner 324. A wavefront sensor 326 measures variation in phase of this combined beam 328 and provides control feedback to one or more processors 330. The processors generate the command signals to translate the mirrors in each segment to provide phase correction and to tip/tilt the phase-corrected amplified laser beams to form the spectrally beam combined, multi-channel coherent laser beam 316.

Functionally the components beams for each wavelength are phase-corrected and combined to form the coherent laser beams at different wavelengths. The different channels i.e. the different coherent laser beams, are then combined to form the spectrally beam combined, multi-spectral coherent laser beam. As implemented, the multi-spectral beam steering is superimposed upon the beam steering for each wavelength so that all phase-corrections and steering to produce the spectrally beam combined, multi-channel coherent laser beam happens simultaneously. The pick-off samples the spectral combined beam or coherent laser beam components and the wavefront sensor provides feedback control to adjust the phase to maintain coherency of each in the spectrally combined beam.

In a degenerative case in which each "section" comprises a single "segment", there is one component laser beam for each wavelength. The MEMS MMA corrects the combines the beam to produce the spectrally combined beam, in a more general case in which each "section" includes multiple "segments", there are multiple component laser beams for each wavelength. The MEMS MMA provides phase-correction at each wavelength and steering at each wavelength and across the wavelengths to produce the spectrally beam combined, multi-channel coherent laser beam such that the combined beam behaves as if it were emitted from a single aperture laser, but with higher brightness than can be obtained from an individual multi-spectral laser or even CBC narrowband lasers at different wavelengths. In some applications, the MEMS MMA may provide additional phase-correction to maintain a zero phase difference across the different wavelengths.

As shown in FIG. 8B, an embodiment of a multi-spectral CBC laser system 400 includes a single MEMS MMA 402 that both forms the component laser beams at the different wavelengths AND performs the phase-correction and steering to form the spectrally beam combined, multi-channel coherent laser beam 404.

A broadband laser source 406 generates a broadband laser beam 408 that spans the wavelengths of the reflective coatings, A lens 410 collimates beam 408 to illuminate a first plurality 412 of sections of MEMS MMA 402, one for each wavelength. Each section includes a reflective coating that reflects at its wavelength to generate one or more laser beams 414 at that wavelength that are amplified by a respectively plurality of optical amplifiers 416. A fold mirror 418 redirects the amplified laser beams 420 onto a second plurality 422 of sections of MEMS MMA 402, one section for each wavelength. Each section is partitioned into one or more segments, one for each component laser beam, to "mirror" the partitioning of the first plurality 412 of sections.

Within each of these sections (wavelength), the tip/tilt/piston of the mirrors is controlled to maintain zero phase difference across the component laser beams and to combine them into a single beam. Superimposed on top of this is additional tip/tilt correction to combine all of the spectral components into the spectrally beam combined, multi-channel coherent laser beam 404. In some applications, additional piston correction is superimposed to maintain zero phase difference between the spectral components.

A pick-off, either a standard pick-off or a mirror in each segment of each section (i.e. for each component laser beam at each wavelength) is used to sample the component coherent laser beams. The sampled beams are mixed with a reference beam 424 provided by broadband source 406 via a beam combiner 426. A wavefront sensor 428 measures variation in phase of this combined beam 430 and provides control feedback to one or more processors 432. The processors generate the command signals to translate the mirrors in each segment to provide phase correction and to tip/tilt the phase-corrected amplified laser beams to form the spectrally beam combined, multi-channel coherent laser beam 404.

In an alternate embodiment, a MEMS MMA is not used to provide the input laser beams of differing wavelengths. For example, the system could employ multiple narrow band master oscillators at different wavelengths. Each would be split into multiple input channels and then amplified. A single MEMS MMA could then be used to provide all of the phase correction and beam steering as previously described to produce the coherent multi-spectral laser beam.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A laser system comprising:
a first plurality of amplified laser beams at a first wavelength in respective input channels, said amplified laser beams exhibiting a non-zero phase difference across the input channels;

a Micro-Electro-Mechanical System (MEMS) Micro-Mirror Array (MMA) comprising a plurality of independently and continuously controllable mirrors to tip and tilt each mirror about first and second orthogonal axes and to translate each mirror in a third axis orthogonal to a plane containing the first and second orthogonal axes, wherein said plurality of mirrors are partitioned into segments that are illuminated by the respective amplified laser beams, each segment including one or more mirrors;

a pick-off positioned to sample the amplified laser beams in each input channel or in a combined output channel;

a wavefront sensor configured to sense a phase difference across the sampled amplified laser beams; and one or more processors configured to generate a first set of command signals to translate the one or more mirrors in each segment along the third axis to adjust the phase and maintain a zero phase difference across all of the amplified laser beams and to generate a second set of command signals tip and tilt the mirrors about the first and second orthogonal axes, respectively, to combine the plurality of phase-adjusted amplified laser beams into a coherent output laser beam in the combined output channel.

2. The laser system of claim 1, wherein each mirror can be actuated range of at least +/−10° in tip and tilt and +/−10 microns translation at a rate of at least 1 kHz.

3. The laser system of claim 1, further comprising:
a master oscillator (MO) that generates a laser beam at the first wavelength $\lambda 1$;
a beam splitter that splits the laser beam into a plurality of laser beams at the first wavelength $\lambda 1$; and
a plurality of optical amplifiers that amplify the plurality of lasers beams, respectively; to provide the plurality of amplified laser beams.

4. The laser system of claim 1; wherein said pick-off comprises at least one pick-off mirror from each said segment, said pick-off mirrors responsive to command signals to sample the respective amplified laser beams in the input channels and re-direct the sampled amplified laser beams to the wavefront sensor.

5. The laser system of claim 1, wherein said pick-off mirrors are time multiplexed.

6. The laser system of claim 1, wherein each segment includes a plurality of mirrors that oversample the amplified laser beam.

7. The laser system of claim 6, wherein said plurality of mirrors in each segment is responsive to command signals to superimpose Adaptive Optics (AO) correction onto the wavefront of the amplified laser beam.

8. The laser system of claim 6; wherein said plurality of mirrors in each segment responsive to command signals to focus or defocus the amplified laser beam.

9. The laser system of claim 1, wherein translation of a mirror from a initial position to adjust the phase produces a lateral offset of the reflected amplified laser beam from a nominal position, wherein said mirror is responsive to command signals to adjust tip and tilt to correct the lateral offset and return the reflected amplified beam to the nominal position.

10. The laser system of claim 1, further comprising:
second, third, . . . and Nth plurality of amplified laser beams at second $\lambda 2$, third $\lambda 3$ and Nth $\lambda N$ wavelengths in respective input channels, said amplified laser beams at each said wavelength exhibiting a non-zero phase difference across the input channels;

wherein said MEMS MMA is partitioned into N sections one for each wavelength, each section is partitioned into segments that are illuminated by the respective amplified laser beam at the corresponding wavelength;

wherein the pick-off samples the first; second, third, . . . and Nth plurality of amplified laser beams; and wherein said one or more processors generate the first and second sets of command signals for each wavelength to maintain a zero phase difference across all of the amplified laser beams at said wavelength and to combine the plurality of phase-adjust amplified laser beams into a coherent output laser beam at that wavelength, and wherein said one or more processors generate a third set of commands to superimpose tip/tilt on the mirrors to combine the coherent output laser beams at the different wavelengths a spectrally beam combined, multi-channel coherent laser beam.

11. The laser system of claim 10, wherein said one or more processors generate a fourth set of commands to superimpose an additional translation to maintain a zero phase difference across the coherent output laser beams at the different wavelengths.

12. A laser system comprising:
a first plurality of amplified laser beams at a first wavelength $\lambda 1$ in respective input channels, said amplified laser beams exhibiting a non-zero phase difference across the input channels;

a Micro-Electro-Mechanical System (MEMS) Micro-Mirror Array (MMA) comprising a plurality of independently and continuously controllable mirrors to tip and tilt each mirror about first and second orthogonal axes and to translate each mirror in a third axis orthogonal to a plane containing the first and second orthogonal axes, wherein said plurality of mirrors are partitioned into segments that are illuminated by the respective amplified laser beams, each segment including a plurality of mirrors;

a pick-off comprising a mirror from each segment to sample the amplified laser beams in each input channel;

a wavefront sensor configured to sense a phase difference across the sampled amplified laser beams; and one or more processors configured to generate a first set of command signals to translate one or more mirrors in each segment along the third axis to adjust the phase and maintain a zero phase difference across all of the amplified laser beams, generate a second set of command signals to tip and tilt the one or more mirrors about the first and second orthogonal axes, respectively, to combine the plurality of phase-adjusted amplified laser beams into a coherent output laser beam in the combined output channel, and generate a third set of commands to actuate the pick-off mirror in each segment to sample the amplified laser beam and re-direct the sampled amplified laser beams to the wavefront sensor.

13. The laser system of claim 12, wherein each segment includes a plurality of mirrors that oversample the amplified laser beam, wherein said plurality of mirrors is responsive to command signals to superimpose a wavefront correction onto the amplified laser beam.

14. The laser system of claim 12, further comprising:
second, third, . . . and Nth plurality of amplified laser beams at second $\lambda 2$, third $\lambda 3$ and Nth $\lambda N$ wavelengths in respective input channels, said amplified laser beams at each said wavelength exhibiting a non-zero phase difference across the input channels;

wherein said MEMS MMA is partitioned into N sections one for each wavelength, each section is partitioned into segments that are illuminated by the respective amplified laser beam at the corresponding wavelength;

wherein the pick-off mirrors sample the first, second, third, . . . and Nth plurality of amplified laser beams; and wherein said one or more processors generate the first and second sets of command signals for each wavelength to maintain a zero phase difference across all of the amplified laser beams at said wavelength and to combine the plurality of phase-adjust amplified laser beams into a coherent output laser beam at that wavelength, and wherein said one or more processors generate a third set of commands to superimpose an additional tip/tilt on the mirrors to combine the coherent output laser beams at the different wavelengths and to combine those beams into a spectrally beam combined, multi-channel coherent laser beam.

15. A multi-spectral laser system comprising:

first, second . . . and Nth pluralities of amplified laser beams at first, second and Nth wavelengths $\lambda 1, \lambda 2 \ldots \lambda N$ in respective input channels, said amplified laser beams at each said wavelength exhibiting a non-zero phase difference across the input channels;

one or more Micro-Electro-Mechanical System (MEMS) Micro-Mirror Array (MMAs), each comprising a plurality of independently and continuously controllable mirrors to tip and tilt each mirror about first and second orthogonal axes and to translate each mirror in a third axis orthogonal to a plane containing the first and second orthogonal axes, said one or more MEMS MMAs partitioned into a first N sections corresponding to a different wavelength, each said section partitioned into a plurality of segments including one or more mirrors that are illuminated by the respective plurality of amplified laser beams at the corresponding wavelength, a pick-off positioned to sample the amplified laser beams in each input channel or in a combined output channel;

a wavefront sensor configured to sense a phase difference across the sampled amplified laser beams; and one or more processors configured to generate a first set of command signals to translate the one or more mirrors in each segment along the third axis to adjust the phase and maintain a zero phase difference across all of the amplified laser beams for each wavelength, a second set of command signals tip and tilt the mirrors about the first and second orthogonal axes, respectively, to combine the plurality of phase-adjusted amplified laser beams into a coherent output laser beam for each wavelength in the combined output channel;

a third set of command signals to superimpose an additional tip/tilt on the mirrors to combine the coherent output laser beams at the different wavelengths into a spectrally beam combined, multi-channel coherent laser beam.

16. The multi-spectral laser system of claim 15, wherein a single common MEMS MMA is partitioned into the N sections.

17. The multi-spectral laser system of claim 16, further comprising:

a broadband optical source that generates a broadband laser beam that spans a plurality of wavelengths $\lambda 1, \lambda 2 \ldots \lambda N$;

an additional N sections of the common MEMS MMA, each section comprising a plurality of mirrors having a reflection coating at the corresponding wavelength $\lambda 1, \lambda 2 \ldots \lambda N$ to reflect the broadband laser beam and produce first, second . . . and Nth pluralities of laser beams at the first, second and Nth wavelengths $\lambda 1, \lambda 2 \ldots \lambda N$ in respective input channels;

a plurality of optical amplifiers that amplify the first, second and Nth plurality of lasers beams, respectively, to provide the first, second and Nth plurality of amplified laser beams; and a fold mirror that reflects the first, second and Nth plurality of amplified laser beams back onto the first N sections of the common MEMS MMA for phase correction and beam combining.

18. The multi-spectral laser system of claim 15, wherein said pick-off comprises at least one pick-off mirror from each said segment, said pick-off mirrors responsive to command signals to sample the respective amplified laser beams at the different wavelengths in the input channels and re-direct the sampled amplified laser beams to the wavefront sensor.

19. The multi-spectral laser system of claim 15, wherein each segment includes a plurality of mirrors that oversample the amplified laser beam, wherein said plurality of mirrors is responsive to command signals to superimpose a wavefront correction onto the amplified laser beam.

20. The multi-spectral laser system of claim 15, wherein said one or more processors generate a fourth set of commands to superimpose an additional translation to maintain a zero phase difference across the coherent output laser beams at the different wavelengths.

* * * * *

UNITED STATES PATENT AND TRADEMARK OFFICE
CERTIFICATE OF CORRECTION

| | |
|---|---|
| PATENT NO. | : 11,522,331 B2 |
| APPLICATION NO. | : 17/029915 |
| DATED | : December 6, 2022 |
| INVENTOR(S) | : Uyeno et al. |

It is certified that error appears in the above-identified patent and that said Letters Patent is hereby corrected as shown below:

On the Title Page

On page 3, in Column 1, Item (56) under "Other Publications", Line 4, delete "Electroniclly" and insert --Electronically-- therefor In the Specification In Column 1, Line 35, delete "(a)," and insert --($\pi$),-- therefor In Column 1, Line 38, delete "(a)," and insert --($\pi$),-- therefor In Column 1, Line 50, before "where", insert --(1)--

In Column 1, Line 52, delete "of≈10" and insert --of ≈10-- therefor

In Column 2, Line 2, delete "SBS," and insert --SBS.-- therefor

In Column 2, Line 30, delete "(ORD)" and insert --(OHD)-- therefor

In Column 2, Line 31, delete "ORD" and insert --OHD-- therefor

In Column 3, Line 30, delete "beam, in" and insert --beam. In-- therefor

In Column 3, Line 60, delete "DIEMS" and insert --MEMS-- therefor

In Column 4, Line 36, delete "λA" and insert --λ1. A-- therefor

In Column 4, Line 46, delete "HO" and insert --110-- therefor

In Column 4, Line 64, delete "mirror+/-10" and insert --mirror +/-10-- therefor

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,522,331 B2

In Column 5, Line 18, delete "comber" and insert --combiner-- therefor

In Column 5, Line 35, delete "120" and insert --109-- therefor

In Column 6, Line 57, delete "MMA," and insert --MMA-- therefor

In Column 6, Line 59, after "MEMS", insert --MMA--

In Column 7, Line 7, delete "MFMS" and insert --MEMS-- therefor

In Column 7, Line 58, delete "beam, in" and insert --beam. In-- therefor

In the Claims

In Column 8, Lines 64-65, in Claim 1, after "wavelength", insert --$\lambda 1$--

In Column 9, Line 35, in Claim 3, delete "respectively;" and insert --respectively,-- therefor In Column 9, Line 37, in Claim 4, delete "claim 1;" and insert --claim 1,-- therefor In Column 9, Line 52, in Claim 8, delete "claim 6;" and insert --claim 6,-- therefor In Column 9, Line 53, in Claim 8, after "segment", insert --is--

In Column 9, Line 64, in Claim 10, delete "$\lambda 3$ and" and insert --$\lambda 3$, . . . and-- therefor In Column 10, Line 5, in Claim 10, delete "first;" and insert --first,-- therefor In Column 10, Line 64, in Claim 14, delete "$\lambda 3$ and" and insert --$\lambda 3$, . . . and-- therefor In Column 11, Lines 6-7, in Claim 14, after "beams;", delete "and"

In Column 11, Line 28, in Claim 15, delete "Array" and insert --Arrays-- therefor In Column 12, Line 3, in Claim 15, after "channel;", insert --and--